June 13, 1961
R. BERGSMA
2,988,717
TEMPERATURE SENSING UNIT
Filed April 18, 1958
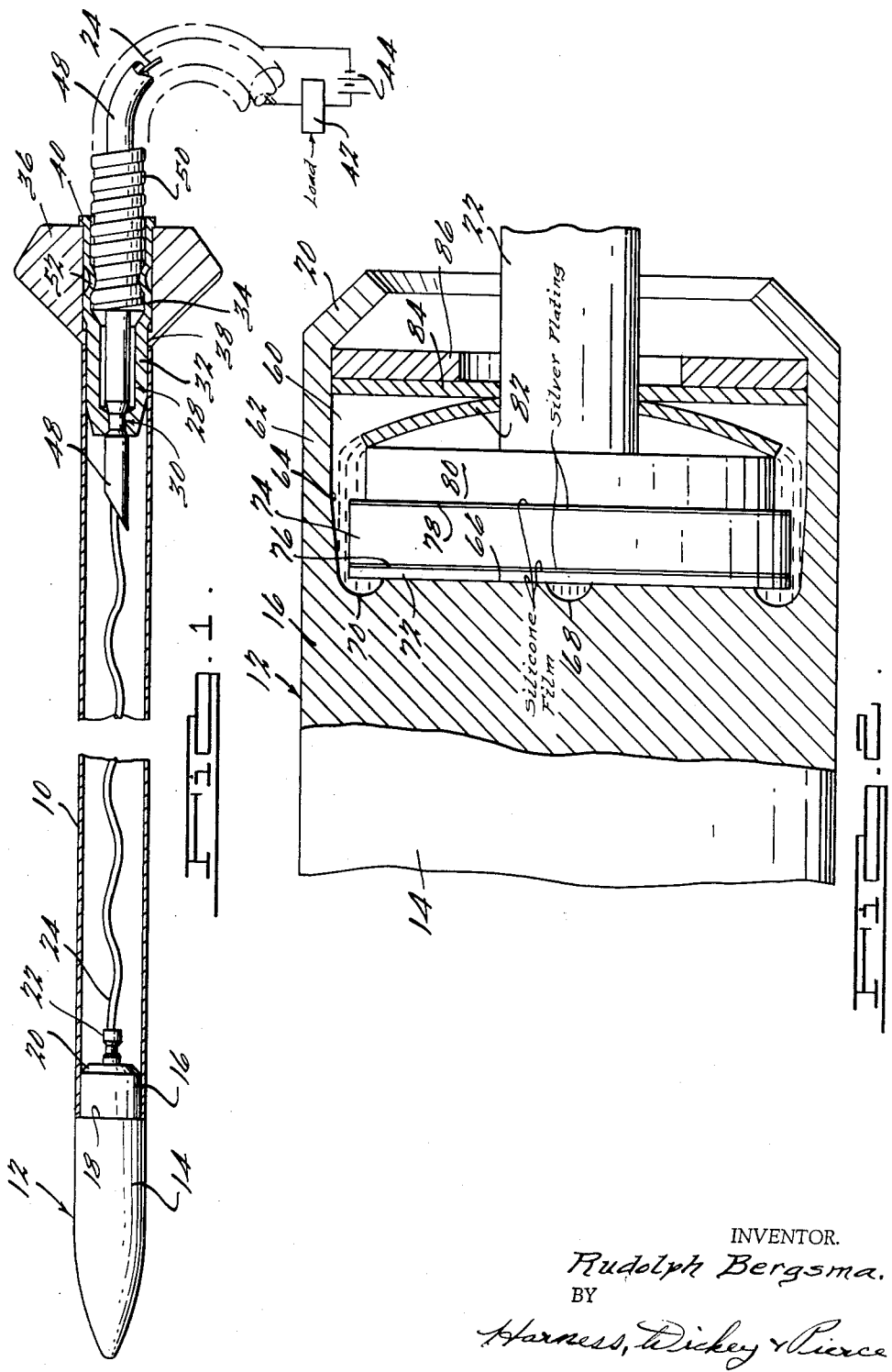
INVENTOR.
Rudolph Bergsma.
BY
Harness, Dickey & Pierce
ATTORNEYS.

2,988,717
TEMPERATURE SENSING UNIT
Rudolph Bergsma, Ann Arbor, Mich., assignor to King-Seeley Thermos Co., a corporation of Michigan
Filed Apr. 18, 1958, Ser. No. 729,332
22 Claims. (Cl. 338—28)

This invention relates to temperature sensing devices.

While the principles of the invention are of general applicability, they are representatively embodied in a probe particularly adapted for sensing the internal temperature of meat, fowl or the like, and constitutes an improvement on devices such as those disclosed in the patent application of Leonard Boddy, Serial No. 524,529, filed July 26, 1955, now Patent No. 2,792,948, and reference may be had thereto for a disclosure of equipment with which the present device may be associated to form a temperature measuring or controlling system.

An object of this invention is to improve the heat transfer relationship between the tip of a temperature sensing device and a temperature responsive element disposed within that device.

Another object of this invention is to reduce the deleterious effects of water which may enter a temperature sensing device such as during washing.

A further object of this invention is to reduce the oxidation of a metallic surface which is in a heat transfer path in a temperature sensing device.

Another object of this invention is to improve the uniformity of mass-produced temperature sensing devices.

Another object of this invention is to insure that the electrically conductive forward and rear faces of a temperature sensing member will not become electrically shorted.

Another object of this invention is to improve the consistency of operation of temperature sensing devices.

A further object of this invention is to reduce variations in the amount of self heating of a current conducting, temperature responsive resistor element.

The manner of accomplishing the foregoing objects, and other objects of the invention, will become apparent from the following detailed description of an embodiment of the invention when read with reference to the accompanying drawings in which:

FIGURE 1 is a view, in partial section, of a temperature sensing device embodying the principles of the present invention and shown, schematically, in association with a source of potential and a load device; and FIG. 2 is an enlarged, fragmentary view of a portion of the structure of FIG. 1.

The temperature sensing device shown in FIG. 1 of the drawings includes a tubular casing 10 which may have a circular cross section and which is desirably made of metal such as stainless steel. A tip 12 is mounted adjacent the forward end of the casing 10, tip 12 having a portion 14 exterior of the casing 10 and having a generally pointed or conoidal end which is adapted for insertion in the mass the temperature of which is to be sensed. Tip 12 further includes a reduced diameter portion 16 disposed interiorly of the casing 10. The reduction of the diameter of the portion 16 is desirably such as to establish a force fit between portion 16 and the interior of casing 10 as well as to form an annular shoulder 18 having a height equal to the wall thickness of the casing 10 to provide a smooth exterior surface at the forward end of the device. To facilitate insertion of the tip 12 into the casing 10, the rear portion of the portion 16 is provided with an effective chamfer 20 which, as will be seen, also serves another function.

A temperature sensing element disposed within portion 16 of tip 12 terminates, at the rear, in a tubular terminal 22 which is crimped, soldered, or otherwise rendered electrically and mechanically integral with the forward end of an insulated lead wire 24.

Lead wire 24 should be of the minimum size commensurate with mechanical strength and the requisite electrical conductivity and a silicone covered No. 26 A.W.G. single strand copper wire has proved satisfactory. Since economies of construction can be effected if it is not necessary to provide ceramic tubes or other supporting means for the length of the lead wire 24, an arrangement has been devised for insuring that wire 24 will remain centered within casing 10 even though the length of that lead wire tends to change due to the quite substantial temperature changes to which it is subjected. This is accomplished by coiling the lead wire 24 prior to assembly in the device, the wire assuming a permanent set in the process. The wire is tensioned and partially uncoiled when the ends thereof are secured to their respective terminal elements, and as a result, wire 24 assumes the undulating shape illustrated in FIG. 1 of the drawings and remains under tension so that any elongation which occurs will result in a partial recoiling of the wire. The axis of the wire and of the coil, however, will remain substantially identical with the axis of the casing 10.

Sleeve 28 comprises a portion 32 fitted securely within the rear end of casing 10 and a somewhat larger diameter portion 34 disposed exteriorly and rearwardly of the casing 10. A knob 36 is bored to accept the portion 34 of the sleeve 32 but is provided with a radially inwardly extending lip 38 adapted to abut and surround the reduced diameter portion 32 of the sleeve 28. In assembly, after the sleeve 28 is inserted through the knob 36, the rearmost end of the sleeve 28 is formed over to define a flange 40 abutting the rear face of the knob 36 to secure the parts in assembled relation. It will be observed that the rear edge of the tube 10 does or may abut the forward annular surface of the knob 36.

The temperature sensing device is connected (normally through a plug and jack arrangement not shown) to a load device 42 and a source of potential 44 diagrammatically illustrated in FIG. 1 of the drawings. Wire 24, as an element of that connection, is disposed within an insulating breather tube 48 which is in turn inserted within an exterior metallic, flexible casing or sheath 50 in the nature of flexible conduit. Tube 48 should be capable of withstanding the temperatures to which it is subjected and may be made of a glass fiber coated with silicone varnish.

One end of the flexible casing 50 is inserted within the rearmost end of the tubular sleeve 28 and is mechanically and electrically secured thereto, such as by forming a crimp 52 in the sleeve to tightly engage the exterior of the casing 50. The end of tube 48 projects beyond the end of sheath 50 within the sleeve 28 and projects beyond that sleeve and into the cavity in casing 10. The tube 48 is tightly secured to the sleeve 28 by crimping the end of sleeve portion 32 upon the tube 48 as at 30.

As will be seen, the temperature sensing element within the tip 12 is provided with two electrical terminals, with conductor 24 being connected to one of those terminals, and with the other terminal being electrically integral with the tip 12 and the casing 10 and hence with the sleeve 28 and the flexible casing 50, so that the casing 50 can be employed as the return circuit path, as is illustrated by the connection of one terminal of the source of potential 44 thereto.

Referring now to the enlarged, fragmentary sectional view of FIG. 2 of the drawings, a cavity or recess 60, representatively of circular cross section, is formed in the rear end of the portion 16 of the tip 12, with that cavity being coaxial with the tip. The cavity 60 is defined by an annular rearwardly projecting wall portion 62 which increases in thickness (to provide a tapering reduction in diameter of the cavity 60) from a point 64 to the end wall 66 of the cavity. A central dimple 68 and an annular groove 70 are formed at the base 66 of the cavity.

A thin metallic member 72 is disposed in abutment with the end wall 66 of the cavity 60, and to the rear of element 72 is a sensing member 74 which is preferably a thermistor disk having a diameter greater than its thickness. Thermistor disks of this nature are available on the market and comprise a ceramic type material having a substantial negative temperature coefficient of resistance and poor thermal conductivity characteristics. The two parallel faces of the disks are intended to serve as electrical terminals for the senser and hence are or may be coated or plated with thin metallic film 76 and 78, respectively, of a metal such as silver.

The flange or disk-shaped head 80 of the terminal element or pin 22 abuts the rear face of the thermistor disk 74 and, as illustrated, is but slightly smaller than the diameter of that disk. A spring washer 82 which may be made of stainless steel, for example, to reduce the possibility that the spring will yield under the applied temperatures, is trapped between the rear face of the head 80 and an insulating washer 84. While the spring washer 82 is smaller in diameter than the diameter of the cavity 60 at this point to prevent electrical shorting, the insulating washer 84 preferably engages the rearwardly extending annular wall portion 62 of the tip 12 and preferably is provided with an aperture substantially the same size as the shank of the terminal element or pin 22 to facilitate centering of the sensing element within the cavity. Insulating washer 84 is backed by a metallic washer 86 which is provided with an aperture substantially larger in diameter than the shank of the terminal element 22.

These several elements are then secured in position by rolling over the rearmost end 20 of the wall portion 62 to lock the backing washer 86 in position. As a result of this construction, the spring 82 exerts its reactive forces against a portion of the tip 12 per se rather than against some remote element within the casing 10.

It has been found that the uniformity of the products can be improved if consistent forces are applied by the springs 82 within the mass-produced articles. To this end, in the preferred method of assembly, prior to the rolling over of the wall ends 20, a tool is placed against the backing washer 86 and an accurately controlled force is applied thereto to deflect the spring 82 accordingly. At this point, the force between the thermistor disk and the end wall 66 of the tip 12 is fixed. Thereafter, the wall ends 20 are rolled over to an exact preselected position with respect to the then position of the rear face of the washer 86, that is, with respect to the tip of the tool which is at that time exerting a force upon washer 86. The extent of the rolling over of the wall ends 20 will or may, therefore, vary from product to product but the internal spring forces within the assembled device will be substantially constant among the produced devices. The wall portion 20 is made sufficiently thick so that it will not effectively yield during applied heat or heat cycles.

It will be perceived that the point 64 at which the inner wall of the cavity 60 commences to taper inwardly commences to the rear of the rear face of the thermistor disk 74. Therefore, if for any reason the thermistor disk 74 becomes decentered with respect to the longitudinal axis of the tip 12 so that a portion of the peripheral edge of the disk touches the wall 62 of the tip 12, it will not be possible for the conductive plating at the forward face of the disk and the conductive plating at the rear of the disk concurrently to engage that wall and hence there will be no effective short-circuiting of the thermistor disk.

The metallic disk 72 can, but need not, be secured either to the plating 76 of the disk 74 or to the end wall 66. Element 72 serves several functions. First, it is desirably quite thin, to the point of being substantially a foil, and is preferably of relatively soft metal. As a result, it conforms to the surface irregularities, at least in part, of the end wall 66 and of the plating 76 upon the disk 74. This serves to establish an improved area of electrical and thermal relationship between the thermistor 74 and the tip 12 and further reduces the possibility that the ceramic-like thermistor 74 will be fractured under the applied forces due to the concentration of those forces at points resulting from irregularities of the thermistor surface. Element 72 serves another very important function particularly if the tip 12 is formed, as is desirable, of aluminum. If an oxide forms upon the end wall 66, the thermal and electrical conductivity between the thermistor 74 and the tip 12 is substantially reduced. It has been discovered that such oxidation tends to occur when the silver plated surface of the thermistor 74 is maintained in direct engagement with the aluminum end wall 66. It is believed that this result accrues from an electrolytic action since silver and aluminum are relatively widely spaced in the electromotive series, aluminum having a considerably greater tendency to go to the oxidized state than silver in this combination of metals. It has further been found that this tendency toward oxidation of the aluminum can be reduced if the metal disposed adjacent the surface 66 is less remote than silver from aluminum in the electromotive series, thereby reducing the electromotive potential between the abutting metallic surfaces. In practice, a thin disk of substantially pure nickel has been found to be excellently suited to this function and it will be observed that nickel is approximately intermediate silver and aluminum in the electromotive series. The advantages of employing a disk 72 to bridge the electromotive potential difference of course does not accrue where, as in certain prior practices, the silver-plated thermistor disk is abutted a copper tip so that this particular function of disk 72 is not fully realized unless the coating on the face of the thermistor and the tip are further spaced in the electromotive series than are copper and silver.

The importance of establishing an intimate heat exchange relationship between the thermistor 74 and the tip 12 is much greater than where wires or other positive temperature coefficient of resistance sensing means are employed. In the current controlling operation, a current flows through the thermistor disk. Since the thermistor has an appreciable resistance, heat is generated within the thermistor in accordance with the product of the square of the current through the thermistor and the resistance of the thermistor and, it will be observed, due to the negative temperature coefficient characteristic of the device, the heat generated will increase with increasing sensed temperatures, assuming a constant applied voltage. It is difficult to dissipate this internally generated heat due to the poor thermal conductivity characteristic of the thermistor material. Consequently, one of the important functions of the intimate transfer relationship between the thermistor disk and the tip 12 to provide a path through which this heat can be dissipated to the tip 12. This action is termed "quenching" of the thermistor. Under static conditions, in the absence of complete quenching, the temperature of the thermistor disk 74 will normally be greater than the temperature of the tip 12 and will produce a corresponding error, and one of the features of this invention is not only to reduce the amount of this error but to insure that the magnitude of the error will remain substantially constant from article to article.

One of the most significant features of the present invention is in the disposing within the cavity 60 of a quantity of liquid having, as desirable characteristics, relatively high electrical resistance, no adverse action upon the elements which it contacts, low volatility and a boiling point above the temperatures to which the sensing device would be expected to be subjected, high resistance to oxidation, water repellant characteristics, a fairly high surface tension, a capability of wetting the metals which it contacts in the unit, and a relatively constant viscosity over the temperature range. A number of fluids can be employed such as mineral and vegetable oils, but the preferred liquid is a silicone liquid. This material is a commercially available organopolysiloxane liquid, a Dow-Corning Type 200 Fluid having a viscosity of 100 centistokes being used in a constructed embodiment of the invention. Since that fluid is the presently preferred liquid, the term silicone liquid will be employed in the ensuing description of the preferred embodiment of the invention.

This silicone liquid is desirably disposed on the several abutting faces of the sensing element. Thus, the silicone liquid can be placed intermediate the forward surface of element 72 and the end wall 66, intermediate the rear surface of the element 72 and the plating 76 and intermediate the plating 78 and the forward surface of the flange 80. In the illustrated arrangement, the silicone liquid is also shown to occupy the space between the periphery of thermistor 74 and the wall 62 as well as the space between the periphery of head 80 and wall 62. The amount of silicone liquid which is placed within the cavity is, of course, not critical and advantages of major significance can be achieved if the fluid is contained in only a portion of the noted locations.

One important advantage of employing the silicone liquid is in the enhanced thermal conductivity characteristics leading to improved quenching of the thermistor, reduced self heating, and more uniform self heating which result therefrom. The silicone liquid on the surface 66 and upon the surface 76 serves to supplant and replace any air which would otherwise occupy the minute cavities formed at those surfaces due to surface irregularities. While the thermal conductivity of silicone liquid is not great, as above noted, it is better than air. If silicone liquid is present around the periphery of thermistor disk 74 and particularly if it bridges the gap between thermistor disk 74 and wall 62, the heat transfer relationship between the periphery of the disk 74 and the wall 62 is correspondingly enhanced to further improve the heat transfer. Similarly, if the silicone liquid is present around the periphery of the flange 80 and particularly if it bridges the gap between the periphery of the flange 80 and the wall 62, an additional heat transfer path is established from the thermistor disk 74 through the head 80, radially of the head through the silicone liquid and to the wall 62.

It is also believed, based upon experimental evidence, that the presence of the silicone liquid upon the surfaces of the cavity 60, particularly if the tip 12 is manufactured of aluminum, serves markedly to reduce the tendency toward and the effects of oxidation of those surfaces upon the thermal conductivity characteristics of the unit. The other advantages of using the fluid remain of significance if the tip is formed of a metal other than aluminum.

It also appears that if minute quantities of water enter the cavity within the casing 10 (FIG. 1) as a result of a partial failure of the seals at either end of that casing, the presence of the silicone liquid will reduce the possibility of that water entering the critical areas of the cavity 60 and producing malfunctioning.

In the preferred method of assembly of the unit, the disk 72 or the thermistor disk 74 is immersed in a bath of the silicone liquid. When the disk is removed from that bath, an appreciable quantity of silicone adheres to the surface thereof due to the fact that it wets that surface and due to its own surface tension. When the disk 72 or 74 is inserted in the cavity 60 and the remaining elements assembled thereto, the silicone liquid is distributed, as a result of the applied forces, and will cover all or part of the above noted portions of the sensing element in accordance with the quantity of the silicone liquid which is present. Its relatively high surface tension contributes to the retention of the silicone liquid adjacent the thermistor 74, as illustrated, despite the shocks to which the temperature sensing device is subjected. However, insulating washer 84 does or may also contribute to the retention of the liquid within the cavity 60.

The method of construction of the tip and sensing element subcombination permits assembly and testing of those elements prior to the insertion of the tip 12 in the casing 10.

The primary errors which occur in temperature sensing devices of this nature which cause the mass-produced products to vary from one another result primarily from variations in the force exerted upon the thermistor, from variations in the thermistors themselves, and from the self-heating error which was above discussed. The disclosed spring arrangement in which the spring is anchored against a portion of the tip itself and in which the force exerted upon the thermistor disk is accurately controlled in manufacture reduces the first of these sources of errors. The reduction of oxidation of an aluminum tip surface and the enhancement of the thermal conductivity relationships between the thermistor and a tip of any metal produced by the presence of the silicone liquid have been found to reduce the self-heating error by a substantial amount and to cause the self-heating error to be quite consistent among the manufactured products. As a result, it has been found that the manufacturer has the choice of producing a temperature sensing device having a much greater accuracy using fairly expensive, low-tolerance thermistors or, if the overall system accuracy is good, the choice of employing larger-tolerance and hence cheaper thermistors and still produce the same overall system accuracy.

While it will be apparent that the embodiment of the invention herein disclosed is well calculated to fulfill the objects of the invention, it will be appreciated that the invention is susceptible to modification, variations and change without departing from the proper scope or fair meaning of the subjoined claims.

What is claimed is:

1. A current modulating temperature responsive device comprising an aluminum tip, a senser element having a substantial temperature coefficient of resistance and a surface facing a surface of said tip, a metallic silver film between said surface of said tip and said surface of said element, and a metallic element disposed between said silver film and said aluminum tip, said metallic element being selected from the metals which are between aluminum and silver in the electromotive series.

2. A current modulating temperature responsive device comprising an aluminum tip, a sensing element having a substantial temperature coefficient of resistance and a surface facing a surface of said tip, a metallic silver film between said surface of said tip and said surface of said sensing element, and a thin nickel element disposed between said silver film and said aluminum tip.

3. A current modulating temperature responsive device comprising a tubular casing, a tip having a forward portion exterior of said casing and a rear portion disposed within said casing, said rear porton havng a rearwardly extending wall portion defining a rearwardly opening cavity having a forward wall extending substantially normal to the axis of the tip, a thermistor member disposed within the cavity and having a pair of generally parallel surfaces one of which faces said forward wall, a generally inwardly extending flange portion integral with said wall portion, a contact element engaging said thermistor member, an electrical conductor connected to said contact element, and means including spring means located between said thermistor member and said flange portion for exerting a substantial force on said thermistor member.

4. The combination of claim 3 in which the cross-sectional size of the cavity in the region of the forward surface of the thermistor member is less than the cross-sectional size of the cavity in the region of the rearward surface of the thermistor member.

5. The combination of claim 3 in which said cavity is partially filled with a liquid having a boiling point above the maximum sensed temperature and better thermal conductivity than air and remaining liquid throughout the range of sensed temperatures.

6. The combination of claim 5 in which said thermistor member further has an edge surface spaced by an annular volume from said wall portion, and in which said annular volume is at least partially filled with said liquid.

7. The method of reducing the tendency of one of two different metals in a temperature sensing device subjected to a range of sensed temperatures to oxidize, each of those different metals having a surface which abuts and electrically contacts the surface of the other one of those metals, which comprises the steps of coating one of the two surfaces with a silicone liquid which remains liquid over the entire range of sensed temperatures and which adheres to that one surface, and thereafter moving the two surfaces into abutting and electrically contacting engagement while the liquid is adhering to said one surface.

8. The method of manufacturing a temperature responsive device for measuring temperatures over a range of temperatures and having a metallic tip, a temperature responsive element retained in intimate heat transfer relation with the tip and a liquid on said element which comprises the steps of immersing the temperature responsive element in a liquid of better thermal conductivity than air and which remains liquid throughout said range of temperatures and which adheres to the temperature responsive element, and thereafter moving the temperature responsive element into intimate heat transfer engagement with the tip while the liquid is adhering thereto.

9. The method of manufacturing a temperature sensing device having a thermistor, a spring and a backing washer disposed within a cavity in the tip of the device which comprises the steps of applying a preselected force to the backing washer in a direction to force the thermistor toward the base of the cavity and to partially compress the spring, and bending the end of the cavity walls inwardly and toward the backing washer to a preselected positional relationship with the backing washer.

10. A preassembled and pretestable electrical tip assembly for association with a casing to form a temperature sensing probe comprising a tip having a rearwardly extending wall portion defining a rearwardly opening cavity having a forward wall extending substantially normal to the axis of the tip, a disc-like thermistor member disposed within the cavity and having a pair of generally parallel surfaces one of which faces said end wall, and means acting against the other face of said thermistor element for retaining said thermistor member within said cavity, the cross-sectional size of the cavity in the region of the forward surface of the thermistor member being less than the cross-sectional size of the cavity in the region of the rearward surface of the thermistor member.

11. The combination of claim 10 in which said cavity is partly filled with a liquid having a thermal conductivity better than air and a boiling point above the range of sensed temperatures.

12. The method of manufacturing a preassembled temperature sensing assembly having a metallic member adapted to be disposed in heat transfer relation with a body, the temperature of which is to be sensed, a temperature responsive element adjacent said member, adjustable spring anchoring means secured to the metallic member, and a spring disposed between and exerting a force between the temperature responsive element and the spring anchoring means tending to force the temperature responsive element toward the metallic member which comprises the steps of applying a preselected force to move a portion of the spring in a direction to force the temperature responsive element towards said metallic member and to partially compress the spring, and adjusting the spring anchoring means to a preselected positional relationship to said portion of the spring.

13. In a current modulating temperature responsive device for connection in a temperature measuring circuit in which measuring current flows, the combination of metallic tip means having a face surface and adapted to be placed in heat transfer relation with an article the temperature of which is to be sensed, thermistor sensing means having a substantial temperature coefficient of resistance and having a face surface forcefully engaging said face surface of said tip means, said face surfaces having substantial areas of direct abutment except for minute cavities therebetween resulting from irregularities of the surfaces thereof, said sensing means being subject to an erroneous change of resistance produced by self heating resulting from the passage of the measuring-circuit current therethrough, and means for improving the transfer of heat between said sensing means and said tip means and for reducing variations of the self heating error resulting from variations in the characteristics of said sensing means from standard comprising a liquid which remains liquid throughout the range of sensed temperatures and which has a boiling point above the maximum sensed temperature and better thermal conductivity than air disposed on both of said face surfaces and filling said minute cavities.

14. The combination of claim 13 in which one of said face surfaces is aluminum and in which the other one of said face surfaces is silver and in which said liquid fills the cavities between said aluminum surface and said silver surface.

15. The combination of claim 13 in which one of said tip and sensing means includes a metallic element and constituting a part of the heat transfer path between a portion of said sensing means and a portion of said tip means and in which one of said face surfaces is the face of said metallic element.

16. The combination of claim 13 in which said thermistor sensing means comprises a ceramic element and a metallic film on at least the face thereof which is most remote from said tip means, and further including a metallic element serving as an electrical contact and engaging said metallic film, means including spring means for forcing said metallic element toward said thermistor sensing means and into intimate engagement with said metallic film, said film and said metallic element being in direct abutment except for minute cavities therebetween resulting from irregularities of the surfaces thereof, and in which said liquid also fills said minute cavities between said film and said metallic element.

17. The combination of claim 13 in which said thermistor sensing means comprises a disk-like ceramic element having forward and rear surfaces both coated with a metallic film and an edge surface, and in which all surfaces of said sensing element are coated with said liquid.

18. The combination of claim 13 in which one of said face surfaces is aluminum and in which the other one of said face surfaces is silver and in which said liquid is a silicone liquid and fills the cavities between said aluminum surface and said silver surface.

19. The combination of claim 13 in which said thermistor sensing means comprises a disk-like ceramic element having forward and rear surfaces both coated with a metallic film and an edge surface, and in which all surfaces of said sensing element are coated with said liquid.

20. The combination of claim 15 in which said thermistor sensing means includes a ceramic element and a metallic film on a portion of the surface thereof, and in which said metallic film is the other one of said face surfaces.

21. In a current modulating temperature responsive device for connection in a temperature measuring circuit in which measuring current flows, the combination of a metallic tip having a face surface and adapted to be placed in heat transfer relation with an article the temperature of which is to be sensed, a thermistor sensing element having a substantial temperature coefficient of resistance and having a face surface, a metallic element having one face surface forcefully engaging said face surface of said tip and another face surface forcefully engaging said face surface of said sensing element, said face surfaces of said metallic element having substantial areas of direct abutment with said face surfaces of said tip and of said sensing element except for minute cavities therebetween resulting from irregularities of the surfaces thereof, said sensing element being subject to an erroneous change of resistance produced by self heating resulting from the passage of the measuring-circuit current therethrough, and means for improving the transfer of heat between said sensing element and said tip through said metallic element and for reducing variations of the self heating error resulting from variations in the characteristics of said sensing element from standard comprising a liquid which remains liquid throughout the range of sensed temperatures and which has a boiling point above the maximum sensed temperature and better thermal conductivity than air disposed on one of said face surfaces of said element and on the face surface engaged thereby and filling the minute cavities therebetween.

22. In a current modulating temperature responsive device for connection in a temperature measuring circuit in which measuring current flows, the combination of a metallic tip having a face surface and adapted to be placed in heat transfer relation with an article the temperature of which is to be sensed, a thermistor sensing element having a substantial temperature coefficient of resistance and having a face surface, a metallic element having one face surface forcefully engaging said face surface of said tip and another face surface forcefully engaging said face surface of said sensing element, said face surfaces of said metallic element having substantial areas of direct abutment with said face surfaces of said tip and of said sensing element except for minute cavities therebetween resulting from irregularities of the surfaces thereof, said sensing element being subject to an erroneous change of resistance produced by self heating resulting from the passage of the measuring-circuit current therethrough, and means for improving the transfer of heat between said sensing element and said tip through said metallic element and for reducing variations of the self heating error resulting from variations in the characteristics of said sensing element from standard comprising a liquid which remains liquid throughout the range of sensed temperatures and which has a boiling point above the maximum sensed temperature and better thermal conductivity than air disposed on all of said face surfaces and filling said minute cavities.

References Cited in the file of this patent

UNITED STATES PATENTS

| | | |
|---|---|---|
| 1,608,321 | Kassteen | Nov. 23, 1926 |
| 2,307,626 | Kelly | Jan. 5, 1943 |
| 2,405,192 | Davis | Aug. 6, 1946 |
| 2,444,410 | Keinath | June 29, 1948 |
| 2,460,795 | Warrick | Feb. 1, 1949 |
| 2,635,137 | Basham | Apr. 14, 1953 |
| 2,705,749 | Daily et al. | Apr. 5, 1955 |
| 2,799,758 | Hutchins | July 16, 1957 |
| 2,886,683 | Klavitter | May 12, 1959 |
| 2,890,429 | Baker | June 9, 1959 |

FOREIGN PATENTS

| | | |
|---|---|---|
| 506,196 | Great Britain | May 24, 1939 |

OTHER REFERENCES

Keystone Carbon Co. (Neg. Temp. Coef. Resist Mat'l), 1943.